No. 690,303. Patented Dec. 31, 1901.
J. ST. C. LEGGE.
CARBURETER.
(Application filed May 25, 1901.)
(No Model.)
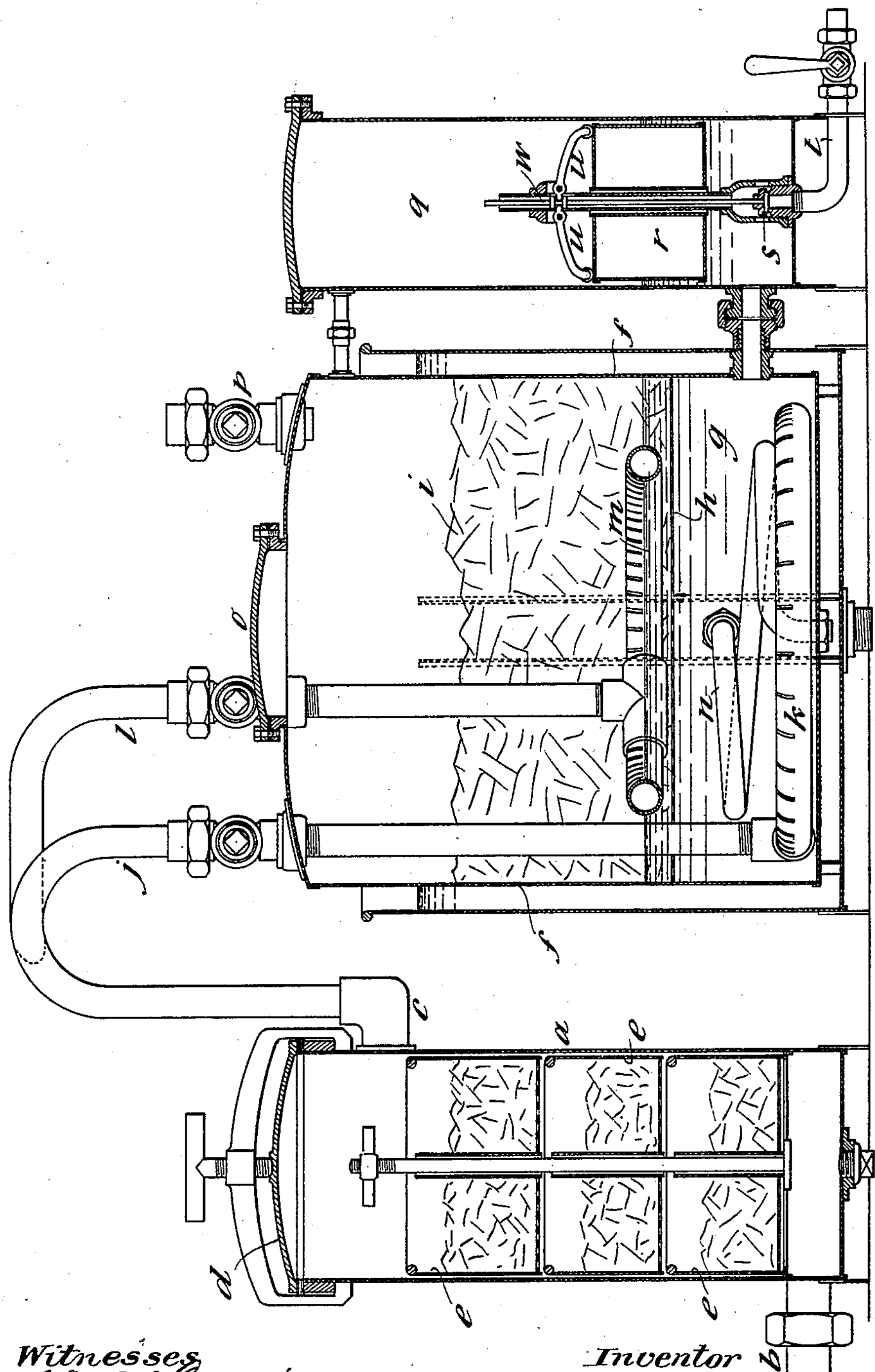
Witnesses
H. M. Corwin
S. M. Redman
Inventor
J. St C. Legge
by Bakewell & Byrnes
his attys.
THE NORRIS PETERS CO., PHOTO-LITHO., WASHINGTON, D. C.

UNITED STATES PATENT OFFICE.

JAMES ST. C. LEGGE, OF LONDON, ENGLAND, ASSIGNOR TO THE AEROLENE LIGHT SYNDICATE, LIMITED, OF LONDON, ENGLAND.

CARBURETER.

SPECIFICATION forming part of Letters Patent No. 690,303, dated December 31, 1901.

Application filed May 25, 1901. Serial No. 61,885. (No model.)

*To all whom it may concern:*

Be it known that I, JAMES ST. CLAIR LEGGE, engineer, a citizen of England, residing at No. 16 St. Helen's Place, in the city of London, England, have invented certain new and useful Improvements in Apparatus for Carbureting Air, (for which I have made application for a patent in Great Britain, No. 9,513, dated May 7, 1901, and in France, dated May 9, 1901, No. 299,242,) of which the following is a specification.

This invention relates to apparatus for carbureting air—that is to say, mixing with it vapor of a volatile hydrocarbon liquid, so as to produce an inflammable mixture available for heating or lighting purposes.

The accompanying drawing is a longitudinal section of apparatus according to this invention.

*a* is a drying vessel having an inlet *b* and an outlet *c* for air supplied to it at moderate pressure by a fan, blower, or other suitable means. In this vessel, which has a removable cover *d*, are holders *e*, having perforated bottoms and containing quicklime or calcium chlorid, through which the air passes, becoming dried.

*f* is the carbureting vessel, containing in its lower part the hydrocarbon liquid *g* and above a perforated partition *h* fragments *i* of pumice-stone or other porous material. From the outlet *c* of the drying vessel *a* a pipe leads having two branches provided with valves or stop-cocks, the one branch *j* leading to a coil *k* of perforated pipe immersed in the liquid, the other, *l*, leading to a coil *m* of perforated pipe under the porous material *i*. The vessel *f* has its sides and bottom water-jacketed, and immersed in the hydrocarbon liquid is a pipe-coil *n*, both ends of which communicate with the water of the jacket. From the roof of the vessel *f*, part of which, *o*, is removable, is an outlet-pipe *p*, provided with a valve or stop-cock and leading to a suitable gas-holder.

*q* is a feed-regulating vessel communicating above and below with the vessel *f* and containing a float *r* and a valve *s*, covering the mouth of a pipe *t*, which is provided with a stop-cock and communicates with a reservoir of hydrocarbon liquid situated at a somewhat higher level.

On the upper part of a pipe *t'*, leading up from the valve-case, are pivoted two levers *u*, the long arms of which rest on the float *r*, and the short arms are connected to a rod *w*, extending down to the valve *s*. When the level of the liquid in the vessels *f* and *q* is lowered, the float *r* descends, raising the rod *w*, and fresh liquid enters by the pipe *t*, raising the valve *s* until the level of the liquid is raised, raising the float and the long arms of the levers *u*, the short arms of which depress the rod *w*, closing the valve *s*. Thus the hydrocarbon liquid in *f* is maintained at a constant level, and the excessive cooling due to its evaporation is also prevented by water caused to circulate through the jacket and coil *n*. The dried air from *a* passes partly by the branch pipe *j* to the pipe-coil *k* and issues through its perforations through the liquid, taking up vapor. The dried air also passes partly by the branch pipe *l* to the coil *m* and issues through its perforations. Both portions of the air—that which is carbureted by passing through the liquid and that which is not carbureted—pass through the porous material *i*, the air and vapor becoming thoroughly mingled, so as to form a combustible mixture, which passes by the pipe *p* to the gas-holder. By adjusting the valves or stop-cocks of the branch pipes *j* and *l* more or less of the air can be carbureted, producing a more or less combustible mixture, as may be desired. Also by this adjustment the action of the apparatus can be made constant, or nearly so, notwithstanding great variations of external temperature, all or nearly all the air being passed through the liquid in cold weather and a smaller quantity in hot weather, when the liquid evaporates more freely.

Having thus described the nature of this invention and the best means I know for carrying the same into practical effect, I claim—

Apparatus for carbureting air comprising an air-drying vessel containing material absorptive of moisture, an inlet for air thereinto, an outlet having two valved branch pipes terminating in coils of perforated pipe, a carbureting vessel in two compartments separated by a perforated partition, the one perforated coil situated below the partition and immersed in liquid hydrocarbon the other perforated coil and a deep layer of porous material above the partition, a water-jacket surrounding and a pipe-coil immersed in the hydrocarbon, and a vessel for supplying the hydrocarbon provided with a float and valve, substantially as described.

In testimony whereof I have hereunto set my hand in presence of two subscribing witnesses.

J. ST. C. LEGGE.

Witnesses:
GERALD. L. SMITH,
EDWARD GARDNER.